United States Patent
Kurashina et al.

(10) Patent No.: US 10,648,093 B2
(45) Date of Patent: May 12, 2020

(54) WATER ELECTROLYSIS SYSTEM AND METHOD OF CONTROLLING THE SAME

(71) Applicant: HONDA MOTOR CO., LTD., Minato-ku, Tokyo (JP)

(72) Inventors: Daisuke Kurashina, Wako (JP); Jun Takeuchi, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 260 days.

(21) Appl. No.: 15/817,463

(22) Filed: Nov. 20, 2017

(65) Prior Publication Data

US 2018/0148849 A1    May 31, 2018

(30) Foreign Application Priority Data

Nov. 25, 2016  (JP) ................... 2016-228883

(51) Int. Cl.
| | | |
|---|---|---|
| C25B 15/02 | (2006.01) | |
| C25B 15/08 | (2006.01) | |
| C25B 1/10 | (2006.01) | |
| C25B 1/12 | (2006.01) | |
| C25B 9/08 | (2006.01) | |

(52) U.S. Cl.
CPC .............. C25B 15/02 (2013.01); C25B 1/10 (2013.01); C25B 1/12 (2013.01); C25B 9/08 (2013.01); C25B 15/08 (2013.01); Y02E 60/366 (2013.01)

(58) Field of Classification Search
CPC ............... C25B 1/10; C25B 1/12; C25B 9/08
See application file for complete search history.

(56) References Cited

U.S. PATENT DOCUMENTS 7,581,431 B2    9/2009  Yoshida
2007/0193340 A1*  8/2007  Yoshida ............ H01M 8/04231
                                                                 73/46

FOREIGN PATENT DOCUMENTS

| CN | 1930719 | 3/2007 | |
|---|---|---|---|
| JP | 2012-219276 | 11/2012 | |
| JP | 2014-080634 | 5/2014 | |
| JP | 2015-175037 | * 10/2015 | ............ C25B 9/00 |

OTHER PUBLICATIONS

Chinese Office Action and Search Report for Chinese Patent Application No. 201711175057.5 dated Mar. 6, 2019.

* cited by examiner

Primary Examiner — Salil Jain
(74) Attorney, Agent, or Firm — Amin, Turocy & Watson, LLP (57) ABSTRACT

In a water electrolysis system and a method of controlling the water electrolysis system, a control device places a high pressure water discharge solenoid valve, a depressurizing solenoid valve, and a low pressure water discharge solenoid valve in the closed state. Further, a pressure acquisition unit obtains the electrolysis time pressure as a pressure in the low pressure water sealing container during production of hydrogen by a water electrolyzer. Further, the control device determines the occurrence of hydrogen leakage in a depressurizing line based on at least the electrolysis time pressure.

3 Claims, 5 Drawing Sheets

| | NORMAL ELECTROLYSIS CONTROL | | | | |
|---|---|---|---|---|---|
| | ELECTROLYSIS START TIME | | | | |
| | (DEPRESSURIZING LINE MONITOR CONTROL TIME) | | ELECTROLYSIS PROCESS TIME (NORMAL) | DEPRESSURIZING PROCESS TIME (WATER DISCHARGE TIME) |
| | STANDBY TIME | MONITOR START TIME | ELECTROLYSIS PROCESS TIME (MONITOR TIME) | | |
| ELECTROLYSIS POWER SUPPLY 34 | OFF | OFF | ON | ON | ON |
| HYDROGEN LINE BACK PRESSURE VALVE 94 | CLOSE | CLOSE | CLOSE/OPEN (SWITCH IN CORRESPONDENCE WITH PRESSURE OF HYDROGEN OUTLET LINE) | CLOSE/OPEN (SWITCH IN CORRESPONDENCE WITH PRESSURE OF HYDROGEN OUTLET LINE) | CLOSE |
| HIGH PRESSURE WATER DISCHARGE SOLENOID VALVE 102 | CLOSE | OPEN | OPEN/CLOSE (SWITCH IN CORRESPONDENCE WITH WATER LEVEL ON HIGH PRESSURE SIDE) | CLOSE/OPEN (SWITCH IN CORRESPONDENCE WITH WATER LEVEL ON HIGH PRESSURE SIDE) | OPEN/CLOSE (SWITCH IN CORRESPONDENCE WITH WATER LEVEL ON HIGH PRESSURE SIDE) |
| DEPRESSURIZING PRESSURE REDUCING VALVE 110 | OFF | OFF | OFF | OFF | ON |
| DEPRESSURIZING METERING VALVE 112 | OFF | OFF | OFF | OFF | ON (REGULATE FLOW RATE IN CORRESPONDENCE WITH PRESSURE ON HIGH PRESSURE SIDE) |
| DEPRESSURIZING SOLENOID VALVE 114 | OPEN | OPEN | CLOSE | CLOSE | OPEN |
| EXHAUST GAS BACK PRESSURE VALVE 130 | CLOSE | CLOSE | CLOSE/OPEN (SWITCH IN CORRESPONDENCE WITH PRESSURE ON LOW PRESSURE SIDE) | CLOSE/OPEN (SWITCH IN CORRESPONDENCE WITH PRESSURE ON LOW PRESSURE SIDE) | CLOSE/OPEN (SWITCH IN CORRESPONDENCE WITH PRESSURE ON LOW PRESSURE SIDE) |
| LOW PRESSURE WATER DISCHARGE SOLENOID VALVE 140 | CLOSE | OPEN | CLOSE/OPEN (SWITCH IN CORRESPONDENCE WITH WATER LEVEL ON LOW PRESSURE SIDE) | CLOSE/OPEN (SWITCH IN CORRESPONDENCE WITH WATER LEVEL ON LOW PRESSURE SIDE) | OPEN/CLOSE (SWITCH IN CORRESPONDENCE WITH WATER LEVEL ON LOW PRESSURE SIDE) |

FIG. 4

WATER ELECTROLYSIS SYSTEM AND METHOD OF CONTROLLING THE SAME

CROSS-REFERENCE TO RELATED APPLICATION

This application is based upon and claims the benefit of priority from Japanese Patent Application No. 2016-228883 filed on Nov. 25, 2016, the contents of which are incorporated herein by reference.

BACKGROUND OF THE INVENTION

Field of the Invention

The present invention relates to a water electrolysis system including a water electrolyzer for electrolyzing water, producing oxygen at an anode, and producing hydrogen having a pressure higher than the pressure of the oxygen at a cathode. Further, the present invention relates to a method of controlling the water electrolysis system.

Description of the Related Art

An object of Japanese Laid-Open Patent Publication No. 2015-175037 (hereinafter referred to as "JP2015-175037A" is to provide a high pressure water electrolysis system and a method of controlling the high pressure water electrolysis system in which it is possible to reduce the number of devices, and perform the water discharge process and the depressurizing process easily and economically ([0009] and Abstract). In order to achieve the object, a control device 62 of a high pressure water electrolysis system 10 of JP2015-175037A (Abstract) includes a normal time water level control unit 52 and a depressurizing time water level control unit 54. At the time of normal electrolysis, the normal time water level control unit 52 controls the water level within a range from a normal time upper limit water level to a normal time lower limit water level. At the time of depressurizing at the cathode, the depressurizing time water level control unit 54 controls the water level within a range from a depressurizing time upper limit water level to a depressurizing time lower limit water level. A gas liquid separator 14 includes a first water discharge pipe 32 provided between the normal time lower limit water level and the depressurizing time upper limit water level, and a second water discharge pipe 34 provided below the depressurizing time lower limit water level.

Figure 1:
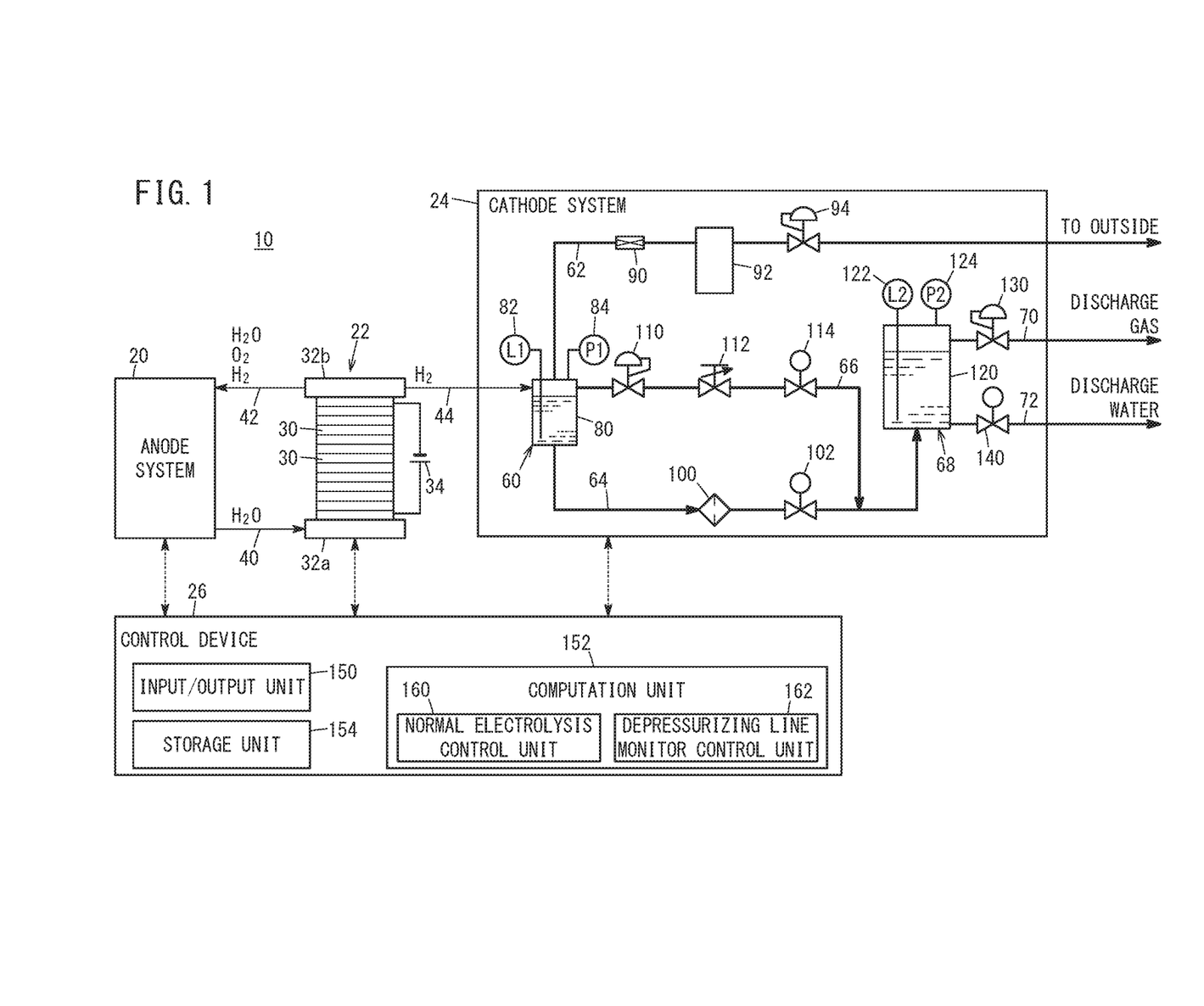
FIG. 1 is a block diagram showing a water electrolysis system according to an embodiment of the present invention.

In the first water discharge pipe 32 (water discharge and depressurizing line), a pressure loss member for reducing the pressure of high pressure water such as an orifice 36 is provided (FIG. 1 and paragraph [0026]). In the second water discharge pipe 34 (high pressure water discharge line), a pressure loss member for reducing the pressure of high pressure water such as an orifice 38 is provided. An open/close valve such as a solenoid valve 40 is provided downstream of the orifice 38 (FIG. 1, paragraph [0026]). The downstream side of the first water discharge pipe 32 and the second water discharge pipe 34 are connected to a water sealing container 42. In the water sealing container 42, water and gas components are separated (FIG. 1 and paragraph [0026]).

SUMMARY OF THE INVENTION

As described above, in JP2015-175037A, the orifice 36 is provided between the first water discharge pipe 32 from the gas liquid separator 14 and the water sealing container 42. Further, the orifice 38 and the solenoid valve 40 are provided between the second water discharge pipe 34 from the gas liquid separator 14 and the water sealing container 42 (FIG. 1 and paragraph [0026]). In JP2015-175037A, there is a room of improvement in discharging hydrogen through the first water discharge pipe 32 (water discharge and depressurizing line) and the water sealing container 42.

The present invention has been made taking the above problem into account, and an object of the present invention is to provide a water electrolysis system and a method of controlling the water electrolysis system which makes it possible to control discharge of hydrogen suitably.

A water electrolysis system according to the present invention includes a water electrolyzer configured to electrically decompose water to produce oxygen at an anode, and produce hydrogen having a pressure higher than a pressure of the oxygen at a cathode, a gas liquid separator configured to separate water content contained in the hydrogen discharged from the water electrolyzer, a hydrogen outlet line configured to lead the hydrogen out of the gas liquid separator, a first water discharge line configured to discharge liquid water retained in the gas liquid separator, a depressurizing line configured to depressurize the gas liquid separator, a low pressure water sealing container provided downstream of the first water discharge line and the depressurizing line, an exhaust gas line configured to discharge a gas in the low pressure water sealing container, a second water discharge line configured to discharge the liquid water retained in the low pressure water sealing container, a high pressure water discharge solenoid valve provided in a first water discharge line, a depressurizing solenoid valve provided in the depressurizing line, a closing valve provided in the exhaust gas line, and configured to close the exhaust gas line, a low pressure water discharge solenoid valve provided in the second water discharge line, a pressure acquisition unit configured to obtain a pressure in the low pressure water sealing container, and a control device configured to determine hydrogen leakage in the depressurizing line in correspondence with the pressure obtained by the pressure acquisition unit.

In the present invention, the occurrence of hydrogen leakage in the depressurizing line is determined in correspondence with the pressure in the low pressure water sealing container provided downstream of the first water discharge line and the depressurizing line. In this manner, in the structure including the low pressure water sealing container, it becomes possible to determine hydrogen leakage in the depressurizing line simply. As a result, it becomes possible to control the discharge of hydrogen suitably.

In a method of controlling a water electrolysis system according to the present invention, the water electrolysis system includes a water electrolyzer configured to electrically decompose water to produce oxygen at an anode, and produce hydrogen having a pressure higher than a pressure of the oxygen at a cathode, a gas liquid separator configured to separate water content contained in the hydrogen discharged from the water electrolyzer, a hydrogen outlet line configured to lead the hydrogen out of the gas liquid separator, a first water discharge line configured to discharge liquid water retained in the gas liquid separator, a depressurizing line configured to depressurize the gas liquid separator, a low pressure water sealing container provided downstream of the first water discharge line and the depressurizing line, an exhaust gas line configured to discharge a gas in the low pressure water sealing container, a second water discharge line configured to discharge the liquid water retained in the low pressure water sealing container, a high pressure water discharge solenoid valve provided in a first water discharge line, a depressurizing solenoid valve provided in the depressurizing line, a closing valve provided in the exhaust gas line, and configured to close the exhaust gas line, a low pressure water discharge solenoid valve provided in the second water discharge line, a pressure acquisition unit configured to obtain a pressure in the low pressure water sealing container, and a control device configured to determine hydrogen leakage in the depressurizing line in correspondence with the pressure obtained by the pressure acquisition unit.

The control method includes the steps of obtaining an electrolysis time pressure by the control device, by placing the high pressure water discharge solenoid valve, the depressurizing solenoid valve, and the low pressure water discharge solenoid valve in a closed state and obtaining the pressure in the low pressure water sealing container during production of the hydrogen by the water electrolyzer as the electrolysis time pressure by the pressure acquisition unit, and determining hydrogen leakage by the control device, by determining occurrence of the hydrogen leakage in the depressurizing line based on at least the electrolysis time pressure.

In the present invention, the occurrence of leakage in the depressurizing line is determined based on at least the electrolysis time pressure (pressure in the low pressure water sealing container during production of hydrogen by the water electrolyzer in the state where the high pressure water discharge solenoid valve, the depressurizing solenoid valve, and the low pressure solenoid valve are placed in the closed state). In this manner, in the structure including the low pressure water sealing container, it becomes possible to determine hydrogen leakage in a simple scheme. As a result, it becomes possible to control the discharge of hydrogen suitably.

The control method may include the step of obtaining a reference pressure by the control device, by placing the high pressure water discharge solenoid valve in the closed state, placing the depressurizing solenoid valve in the open state, and placing the low pressure water discharge solenoid valve in the closed state or the open state, and obtaining the pressure in the low pressure water sealing container during stop of production of the hydrogen by the water electrolyzer as the reference pressure by the pressure acquisition unit. In the hydrogen leakage determination step, the control device may determine the occurrence of hydrogen leakage based on a result of comparison between the electrolysis time pressure and the reference pressure.

In comparison with the case of monitoring the change of the electrolysis pressure over time, the difference between the electrolysis time pressure and the reference pressure tends to be large. Therefore, by determining the occurrence of hydrogen leakage using the result of comparison between the electrolysis time pressure and the reference pressure, it becomes possible to determine the hydrogen leakage relatively highly accurately.

In the reference pressure acquisition step, after the control device places the low pressure water discharge solenoid valve in the open state to reduce the pressure in the low pressure water sealing container, the control device may obtain the reference pressure by the pressure acquisition unit. In the hydrogen leakage determination step, the control device may determine the occurrence of the hydrogen leakage based on a result of comparison between the electrolysis time pressure and the reference pressure after pressure reduction.

In this manner, by using the reduced reference pressure, the difference between the electrolysis time pressure and the reference pressure is highlighted, and thus, it becomes possible to determine the occurrence of hydrogen leakage highly accurately. Further, in the case where the reference pressure is reduced to a certain fixed value, after determination of hydrogen leakage is made repeatedly a plurality of times, the changes in the plurality of electrolysis time pressures can be understood easily. Therefore, it becomes possible to determine the occurrence of hydrogen leakage relatively highly accurately.

The hydrogen leakage determination step may be performed at time of starting production of the hydrogen by the water electrolyzer. In this manner, by determining the occurrence of hydrogen leakage in the state where changes in the electrolysis time pressure are relatively large, it become possible to determine the occurrence of hydrogen leakage highly accurately. Further, by determining the occurrence of hydrogen leakage at the time of starting production of hydrogen, when the hydrogen leakage occurs, it becomes possible to rapidly stop hydrogen production.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A. Embodiment

A.1 Structure

<A-1-1. Overall Structure>

FIG. 1 is a block diagram showing a water electrolysis system 10 according to an embodiment of the present invention. The water electrolysis system 10 includes an anode system 20, a water electrolyzer 22, a cathode system 24, and a control device 26. The anode system 20 supplies pure water to the water electrolyzer 22. The water electrolyzer 22 electrically decomposes (electrolyzes) pure water supplied from the anode system 20 to produce hydrogen and oxygen. The hydrogen produced by the water electrolyzer 22 is sent to the cathode system 24, and the oxygen produced by the water electrolyzer 22 is sent to the anode system 20. The control device 26 controls the overall water electrolysis system 10.

[A-1-2. Anode System 20]

The anode system 20 may have the same structure as the structure disclosed in Japanese Laid-Open Patent Publication No. 2012-219276 (hereinafter referred to as "JP2012-219276A") or Japanese Laid-Open Patent Publication No. 2014-080634 (hereinafter referred to as JP2014-080634A). Some of constituent elements of the anode system 20 are not shown. In the anode system 20, the pure water produced in a pure water production device is supplied to the water electrolyzer 22 through a first pure water supply line, an oxygen gas liquid separator, and a second pure water supply line 40. Further, the pure water and oxygen discharged from the water electrolyzer 22 are supplied to the oxygen gas liquid separator through a circulation line 42. Hydrogen produced in the cathode system 24 partially passes through the water electrolyzer 22, and flows into the anode system 20. Such hydrogen is supplied to the oxygen gas liquid separator through the circulation line 42.

At the oxygen gas liquid separator, the pure water (liquid) is separated from the oxygen and the hydrogen (gas). The separated gas is discharged to the outside from the oxygen gas liquid separator. Further, the separated pure water (liquid) is stored in the oxygen gas liquid separator, and then, supplied again to the water electrolyzer 22 through the second pure water supply line 40. Circulation of the pure water is performed, e.g., by a circulation pump (not shown) provided in the second pure water supply line 40.

[A-1-3. Water Electrolyzer 22]

The water electrolyzer 22 is a differential pressure type high pressure water electrolyzer for producing oxygen and high pressure hydrogen by electrically decomposing water (pure water). The high pressure hydrogen herein means hydrogen at high pressure (e.g., 1 MPa to 70 MPa) which is higher than the pressure of oxygen at normal pressure.

The water electrolyzer 22 includes a plurality of water electrolysis cells 30 (unit cells) which are stacked together. At both ends of the water electrolysis cells 30 in the stacking direction, end plates 32a, 32b are provided. An electrolysis power supply 34 as a direct current power supply is connected to the water electrolyzer 22.

Each of the water electrolysis cells 30 includes a solid polymer electrolyte membrane (ion exchange membrane), electrolyte catalyst layers, and current collectors (all of the ion exchange membrane, the electrode catalyst layers, and current collectors are not shown). The solid polymer electrolyte membrane decomposes the water to produce hydrogen (and oxygen). The electrode catalyst layers include an anode side electrode catalyst layer and a cathode side electrode catalyst layer provided on both surfaces of the solid polymer electrolyte membrane, respectively. The solid polymer electrolyte membrane and electrode catalyst layers form a membrane electrode assembly. The current collectors are provided on both sides of the membrane electrode assembly. Hereinafter, an assembly including the water electrolysis cells 30 is also referred to as the cell unit.

A second pure water supply line 40 is connected to the end plate 32a. The circulation line 42 and a hydrogen supply line 44 are connected to the end plate 32b. Pure water is supplied from the anode system 20 to the second pure water supply line 40. Oxygen produced by reaction, (and permeated hydrogen) and unreacted water, are discharged from the circulation line 42. The hydrogen supply line 44 supplies hydrogen produced by the water electrolyzer 22 to the cathode system 24 (first tank 80 described later).

For example, the water electrolyzer 22 may have the same structure as the structure disclosed in JP2012-219276A, JP2014-080634A, or JP2015-175037A.

[A-1-4. Cathode System 24]

(A-1-4-1. Summary of Cathode System 24)

The cathode system 24 includes a high pressure gas liquid separator 60, a hydrogen outlet line 62, a first water discharge line 64, a depressurizing line 66, a low pressure water sealing container 68, an exhaust gas line 70, and a second water discharge line 72. The high pressure gas liquid separator 60 includes the first tank 80, a first water level sensor 82, and a first pressure sensor 84. A cooling device 90, an absorber 92, and a first back pressure valve 94 are provided in the hydrogen outlet line 62. An orifice 100 and a high pressure water discharge solenoid valve 102 are provided in the first water discharge line 64. A pressure reducing valve 110, a metering valve 112, and a depressurizing solenoid valve 114 are provided in the depressurizing line 66.

The low pressure water sealing container 68 includes a second tank 120, a second water level sensor 122, and a second pressure sensor 124. A second back pressure valve 130 is provided in the exhaust gas line 70. A low pressure water discharge solenoid valve 140 is provided in the second water discharge line 72.

(A-1-4-2. High Pressure Gas Liquid Separator 60)

The high pressure gas liquid separator 60 (hereinafter referred to as the "gas liquid separator 60" or the "separator 60") removes water content contained in the high pressure hydrogen led out from the water electrolyzer 22 through the hydrogen supply line 44. The first tank 80 of the separator 60 stores water content (liquid substance) contained in the hydrogen.

The hydrogen outlet line 62 is connected to an upper portion (e.g. top surface) of the first tank 80. In the structure, hydrogen which entered the first tank 80 is released from the hydrogen outlet line 62 to the outside. Further, the first water discharge line 64 is connected to a lower portion (e.g., bottom surface) of the first tank 80. In the structure, the liquid water stored in the first tank 80 is discharged through first water discharge line 64. Further, the depressurizing line 66 is connected to a side portion (e.g., upper side portion) of the first tank 80. Therefore, in the depressurizing process (described later) at the end of producing the hydrogen, the hydrogen in the first tank 80 is released through the depressurizing line 66.

The first water level sensor 82 (hereinafter also referred to as the "water level sensor 82") detects a water level L1 [m] in the first tank 80. The water level sensor 82 may comprise a sensor for detecting the height of the water surface at a plurality of levels, e.g., by a supersonic wave, etc. Alternatively, the water level sensor 82 may comprise one or a plurality of sensors for detecting contact with the water to determine only whether or not the water surface reaches the height of a detection element (e.g., detect the height of the water surface only at a single level). The first pressure sensor 84 (hereinafter referred to as the "pressure sensor 84") detects the pressure P1 [Pa] of a gas (i.e., hydrogen) in the first tank 80. Detection values (output signals) from the first water level sensor 82 and the first pressure sensor 84 are outputted to the control device 26.

(A-1-4-3. Hydrogen Outlet Line 62)

The hydrogen outlet line 62 leads the high pressure hydrogen separated by the gas liquid separator 60 (or high pressure hydrogen after removal of water content) out of the gas liquid separator 60. The cooling device 90 cools the high pressure hydrogen from the gas liquid separator 60. The absorber 92 absorbs water vapor (water content) contained in the high pressure hydrogen cooled by the cooling device 90. The water content of the high pressure hydrogen is absorbed (or removed) by the absorber 92, and when the pressure of the high pressure hydrogen reaches a predetermined pressure value or more (i.e., when the quantity of the hydrogen in a hermetical space made up of the first tank 80, the hydrogen outlet line 62, etc. becomes predetermined quantity or more), the first back pressure valve 94 discharges the high pressure hydrogen to the outside automatically (i.e., without any instruction from the control device 26). Therefore, after the pressure of product hydrogen (dry hydrogen) is increased to have a predetermined pressure value, the product hydrogen is supplied to an external device (for example, the product hydrogen is filled in a fuel cell electric vehicle (hereafter also referred to as the "FCV")).

(A-1-4-4. First Water Discharge Line 64)

The first water discharge line 64 discharges the liquid water in the high pressure state from the gas liquid separator 60. A pressure loss member for reducing the pressure of the high pressure water, such as an orifice 100 is provided in the first water discharge line 64. The high pressure water discharge solenoid valve 102 (hereinafter also referred to as the "solenoid valve 102") enables/disables the flow of the water in the liquid state (liquid water) in the first water discharge line 64 (ON/OFF), based on an instruction from the control device 26. Stated otherwise, the solenoid valve 102 performs switching between the open state and the closed state of the first water discharge line 64 based on the instruction from the control device 26. It should be noted that, for example, a microtube may be used instead of the orifice 100.

A water leakage sensor (not shown) may be provided in the first water discharge line 64 to detect leakage of water from the first water discharge line 64. Alternatively, leakage of water from the first water discharge line 64 may be detected based on the water level L1 of the gas liquid separator 60. For example, in the electrolysis process described later, reference data which is stored beforehand, to indicate the changes of the water level L1 when the hydrogen is produced in the cathode system 24, is compared with the changes of the water level L1 when the electrolysis process is performed actually. In this manner, it is possible to determine the occurrence of water leakage in the first water discharge line 64.

(A-1-4-5. Depressurizing Line 66)

The depressurizing line 66 depressurizes the gas liquid separator 60. The pressure reducing valve 110 reduces the pressure P1 in the first tank 80 to a target pressure. The metering valve 112 controls the flow rate of the hydrogen flowing through the depressurizing line 66 (i.e., flow rate of hydrogen supplied to the low pressure water sealing container 68) [m$^3$/sec] variably. It should be noted that, for example, an orifice, a microtube, etc. may be used instead of the metering valve 112.

The depressurizing solenoid valve 114 (hereinafter referred to as the "solenoid valve 114") enables/disables the flow of the hydrogen in the depressurizing line 66 (ON/OFF), based on an instruction from the control device 26. Stated otherwise, the solenoid valve 114 performs switching between the open state and the closed state of the depressurizing line 66 based on the instruction from the control device 26. The metering valve 112 and the depressurizing solenoid valve 114 are controlled by the control device 26. The depressurizing line 66 of the embodiment of the present invention is merged with the first water discharge line 64 at a position downstream of the high pressure water discharge solenoid valve 102. Alternatively, the depressurizing line 66 may be connected to the low pressure water sealing container 68 without being merged with the first water discharge line 64. Stated otherwise, the depressurizing line 66 may be merged with the water discharge line 64 in the low pressure water sealing container 68.

(A-1-4-6. Low Pressure Water Sealing Container 68)

The low pressure water sealing container 68 (hereinafter also referred to as the "water sealing container 68") is provided downstream of the first water discharge line 64 and the depressurizing line 66. The second tank 120 of the water sealing container 68 stores liquid water and hydrogen (gas) supplied through the first water discharge line 64 and the depressurizing line 66.

The first water discharge line 64 is connected to a lower portion (e.g., bottom surface) of the second tank 120. It should be noted that the first water discharge line 64 may be connected to another portion (e.g., upper portion) of the second tank 120. Further, in the case where the depressurizing line 66 is connected to the second tank 120 without being merged with the first water discharge line 64, the depressurizing line 66 may be connected to an upper portion, etc. of the second tank 120.

The second water level sensor 122 (hereinafter also referred to as the "water level sensor 122") detects a water level L2 [m] in the second tank 120. The second water level sensor 122 may comprise a sensor for detecting the height of the water surface at a plurality of levels, e.g., by a supersonic wave, etc. Alternatively, the second water level sensor 122 may comprise one or a plurality of sensors for detecting contact with the water to determine only whether or not the water surface reaches the height of a detection element (e.g., detect the height of the water surface only at a single level). The second pressure sensor 124 (hereinafter referred to as the "pressure sensor 124") detects the pressure P2 [Pa] of a gas (i.e., hydrogen) in the second tank 120. Detection values (output signals) from the second water level sensor 122 and the second pressure sensor 124 are outputted to the control device 26.

(A-1-4-7. Exhaust Gas Line 70)

The exhaust gas line 70 discharges hydrogen in the second tank 120 to the outside. Instead of the liquid water, the hydrogen as the gas is discharged. For this purpose, the exhaust gas line 70 is connected to an upper portion (e.g., top surface) of the second tank 120. The second back pressure valve 130 (hereinafter also referred to as the "exhaust gas back pressure valve 130" or the "back pressure valve 130") is a closing valve for closing the exhaust gas line 70 in the normal state (normal time). When the pressure of the hydrogen in the second tank 120 reaches a predetermined pressure value or more (i.e., when the quantity of the hydrogen in the second tank 120 becomes predetermined quantity or more), the second back pressure valve 130 discharges the hydrogen to the outside automatically (i.e., without any instruction from the control device 26). In the structure, it becomes possible to keep the pressure P2 in the second tank 120 within a predetermined range.

(A-1-4-8. Second Water Discharge Line 72)

The second water discharge line 72 discharges the liquid water stored in the low pressure water sealing container 68 to the outside. The second water discharge line 72 is connected to a lower portion (e.g., bottom surface) of the second tank 120, for discharging the liquid water. The low pressure water discharge solenoid valve 140 (hereinafter also referred to as the "solenoid valve 140") enables/disables the flow of the liquid water in the second water discharge line 72 (ON/OFF), based on an instruction from the control device 26). Stated otherwise, the solenoid valve 140 performs switching between the open state and the closed state of the second water discharge line 72 based on the instruction from the control device 26.

[A-1-5. Control Device 26]

(A-1-5-1. Summary of Control Device 26)

The control device 26 is a computer for controlling the entire water electrolysis system 10. For example, the control device 26 includes a central processing unit (CPU). In particular, the control device 26 according to the embodiment of the present invention determines seat leakage (hydrogen leakage) at the depressurizing solenoid valve 114 in the depressurizing line 66 (this process will be described later in detail with reference to FIGS. 3 to 5). As shown in FIG. 1, the control device 26 includes an input/output unit 150, a computation unit 152, and a storage unit 154.

(A-1-5-2. Input/Output Unit 150)

The input/output unit 150 is an input/output interface with devices other than the control device 26 (the anode system 20, the water electrolyzer 22, the water level sensors 82, 122, the pressure sensors 84, 124, the metering valve 112, the solenoid valves 102, 114, 140, etc.). The input/output unit 150 includes an A/D converter circuit (not shown) for converting an inputted analog signal into a digital signal.

(A-1-5-3. Computation Unit 152)

The computation unit 152 performs computation based on signals from the anode system 20, the water electrolyzer 22, the water level sensors 82, 122, the pressure sensors 84, 124, etc. Then, based on the computation result, the computation unit 152 generates signals to be sent to the anode system 20, the water electrolyzer 22, and the cathode system 24.

As shown in FIG. 1, the computation unit 152 includes a normal electrolysis control unit 160 and a depressurizing line monitor control unit 162. Each of the normal electrolysis control unit 160 and the depressurizing line monitor control unit 162 is realized by executing a program stored in the storage unit 154. The program may be supplied from an external device through a communication device (not shown). Part of the program may be implemented by hardware (circuit component).

The normal electrolysis control unit 160 implements normal electrolysis control for producing the hydrogen in an electrolysis process so that the hydrogen can be supplied to the outside through the hydrogen outlet line 62. The normal electrolysis control will be described later with reference FIGS. 2 and 3. The depressurizing line monitor control unit 162 implements depressurizing line monitor control for monitoring the depressurizing line 66. In the embodiment of the present invention, the depressurizing line monitor control is part of the normal electrolysis control. The depressurizing line monitor control will be described later with reference to FIGS. 3 to 5.

(A-1-5-4. Storage Unit 154)

The storage unit 154 stores the program and data used by the computation unit 152. For example, the storage unit 154 includes a random access memory (hereinafter referred to as the "RAM"). As the RAM, a volatile memory such as a resistor, and a non-volatile memory such as a flash memory may be used. Further, the storage unit 154 may include a read only memory (hereinafter referred to as the "ROM") in addition to the RAM.

A-2. Control of Embodiment of Present Invention

[A-2-1. Normal Electrolysis Control]

(A-2-1-1. Summary of Normal Electrolysis Control)

Figure 2:
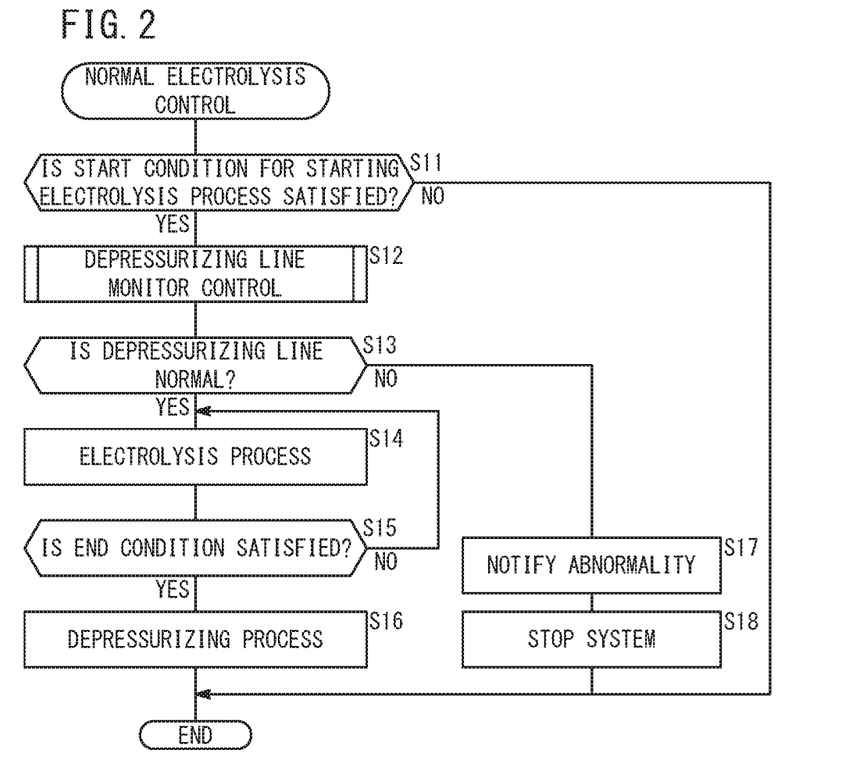
FIG. 2 is a flow chart showing normal electrolysis control according to the embodiment.

FIG. 2 is a flow chart showing normal electrolysis control according to the embodiment of the present invention. In the normal electrolysis control, hydrogen is produced (electrical decomposition is performed). In step S11 of FIG. 2, the control device 26 determines whether or not a start condition for starting the electrolysis process is satisfied. For example, the start condition is satisfied when a user inputs an instruction to start the electrolysis process using a control switch (not shown). If the start condition for starting the electrolysis process is satisfied (S11: YES), the routine proceeds to step S12. If the start condition for starting the electrolysis process is not satisfied (S11: NO), the current normal electrolysis control is finished, and the routine returns to step S11 after a predetermined time period.

In step S12, the control device 26 implements depressurizing line monitor control for monitoring the depressurizing line 66. The depressurizing line monitor control will be described later with reference to FIGS. 3 to 5.

As a result of the depressurizing line monitor control, if the depressurizing line 66 is normal (S13: YES), in step S14, the control device 26 performs the electrolysis process (this process will be described later in detail with reference to FIG. 3). In step S15, it is determined whether or not an end condition for finishing the electrolysis process is satisfied. For example, the end condition is satisfied when the user inputs an instruction to finish the electrolysis process using the control switch. Alternatively, the end condition is satisfied when filling of the product hydrogen in the FCV is completed (for example, when a charging completion signal is received from the FCV).

If the end condition for finishing the electrolysis process is satisfied (S15: YES), the routine proceeds to step S16. If the end condition for finishing the electrolysis process is not satisfied (S15: NO), the routine returns to step S14.

In step S16, the control device 26 performs the depressurizing process. Even in the case where the end condition for finishing the electrolysis process (S15) is not satisfied, if the pressure (e.g., pressure P1) in the cathode system 24 exceeds the pressure threshold value, the depressurizing process may be preformed. The depressurizing process will be described later in detail with reference to FIG. 3.

In step S13, if the depressurizing line 66 is not normal (S13: NO), in step S17, the control device 26 notifies the occurrence of hydrogen leakage in the depressurizing line 66 (notifies abnormality). This notification is made by a speaker and/or a display (not shown). In step S18, the control device 26 emergently stops operation of the water electrolysis system 10. At this time, the control device 26 stores data indicating the occurrence of hydrogen leakage (failure code) in the storage unit 154.

The flow of the normal electrolysis control is basically the same as in the case of the conventional technique (e.g., JP2015-175037A or JP2012-219276A) except the depressurizing line monitor control (S12) and its associated steps S17 and S18.

Hereinafter, after describing the electrolysis process (S14 of FIG. 2) and the depressurizing process (S16), the depressurizing line monitor control (S12) will be described.

(A-2-1-2. Electrolysis Process (S14 of FIG. 2))

(A-2-1-2-1. Summary of Electrolysis Process)

Figure 3:
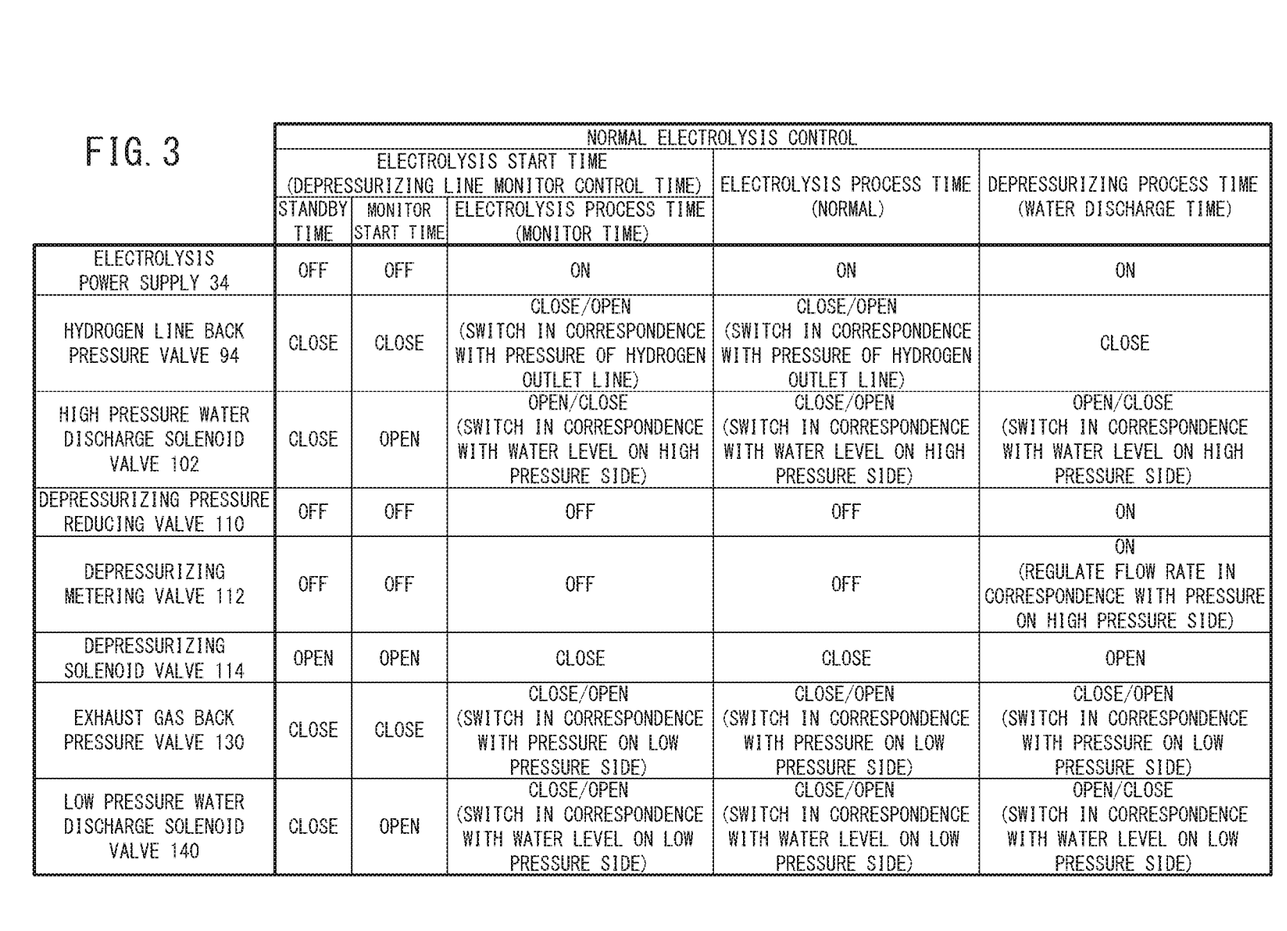
FIG. 3 is a table showing states of an electrolysis power supply and valves in the normal electrolysis control (including depressurizing line monitor control) according to the embodiment.

FIG. 3 is a table showing states of the electrolysis power supply 34 and valves in normal electrolysis control (including depressurizing line monitor control) according to the embodiment of the present invention. In FIG. 3, the electrolysis process corresponds to "ELECTROLYSIS PROCESS TIME (NORMAL)" in the second column from the right.

In the electrolysis process, the control device 26 supplies pure water to the water electrolyzer 22 from the pure water production device in the anode system 20. The water electrolyzer 22 electrically decomposes the pure water to produce hydrogen and oxygen. The produced hydrogen is supplied to the cathode system 24 through the hydrogen supply line 44. The produced oxygen is supplied to the anode system 20 through the circulation line 42. Further, the pure water which has not been decomposed electrically is supplied again to the water electrolyzer 22 through the circulation line 42, the anode system 20 and the second pure water supply line 40.

(A-2-1-2-2. Electrical Decomposition)

In the water electrolyzer 22, the pure water is decomposed electrically as follows: Specifically, in the state where the pure water is supplied to the cell unit of the water electrolyzer 22, the electrolysis power supply 34 is turned on. At this time, the voltage of the electrolysis power supply 34 is applied to both ends of the cell unit in the stacking direction. Consequently, at the anode of the membrane electrode assembly, the water is decomposed to produce hydrogen ions (protons) and oxygen. The hydrogen ions permeate through the solid polymer electrolyte membrane toward the cathode, and the hydrogen ions are combined with electrons to produce hydrogen. Further, at the anode, oxygen is produced.

(A-2-1-2-3. Discharge (or Supply) of Hydrogen)

The hydrogen produced at the cathode is supplied to the high pressure gas liquid separator 60 through the hydrogen supply line 44. At the gas liquid separator 60, the water content contained in the hydrogen is separated from this hydrogen.

The high pressure hydrogen in the gas liquid separator 60 is led out to the hydrogen outlet line 62. After the high pressure hydrogen is cooled by the cooling device 90, the high pressure hydrogen is supplied to the absorber 92. At the absorber 92, the water vapor (water content) contained in the high pressure hydrogen is absorbed, and the product hydrogen in the dried state (dry hydrogen) is obtained.

If the pressure of the product hydrogen before the first back pressure valve 94 is less than a predetermined pressure value of the first back pressure valve 94 (e.g., several tens MPa), the first back pressure valve 94 is kept in the closed state (FIG. 3). Therefore, when production of hydrogen proceeds, and the pressure in the cathode system 24 is increased, the pressure of the product hydrogen is increased accordingly. When the pressure of the product hydrogen before the first back pressure valve 94 has a value equal to or more than the predetermined pressure value of the first back pressure valve 94, the first back pressure valve 94 is placed in the open state temporarily (FIG. 3). As a result, the pressurized product hydrogen is discharged (or supplied) to the outside. For example, the product hydrogen is filled in the FCV (not shown). When the pressure in the product hydrogen is decreased as a result of discharge of the product hydrogen, the first back pressure valve 94 returns to the closed state (FIG. 3).

(A-2-1-2-4. Control of First Water Discharge Line 64)

At the time of performing the electrolysis process, the control device 26 controls the discharge of the liquid water from the first water discharge line 64 in correspondence with the water level L1 of the liquid water stored in the first tank 80. As described above, the water level L1 is detected by the first water level sensor 82. For performing the electrolysis process, the control device 26 sets an upper limit value THl1emax of the water level L1 (hereinafter also referred to as the "electrolysis time upper limit value Thl1emax") and a lower limit value THl1emin (hereinafter referred to as the "electrolysis time lower limit value THl1emin").

As the electrolysis process proceeds, when the water level L1 has a value equal to or more than electrolysis time upper limit value THl1emax, the control device 26 places the high pressure water discharge solenoid valve 102 in the open state (FIG. 3). As a result, the pressure of the liquid water in the first tank 80 is reduced by the orifice 100, and then, the liquid water is supplied to the low pressure water sealing container 68. Further, when the water level L1 has a value equal to or less than the electrolysis time lower limit value THl1emin, the control device 26 places the high pressure water discharge solenoid valve 102 in the closed state (FIG. 3). As a result, the supply of water from the first tank 80 to the low pressure water sealing container 68 is stopped.

(A-2-1-2-5. Control of Depressurizing Line 66)

During the electrolysis process, the control device 26 places the depressurizing solenoid valve 114 in the closed state. Therefore, the depressurizing line 66 is closed, and the hydrogen does not flow. At this time, the control device 26 places the pressure reducing valve 110 and the metering valve 112 in the OFF state.

(A-2-1-2-6. Operation of Exhaust Gas Line 70)

During the electrolysis process, when the liquid water in the second tank 120 is increased, the pressure P2 in the second tank 120 is increased. When the hydrogen in the second tank 120 reaches a predetermined pressure value or more, the second back pressure valve 130 discharges the hydrogen to the outside automatically (i.e., without any instruction from the control device 26).

(A-2-1-2-7. Control of Second Water Discharge Line 72)

At the time of performing the electrolysis process, the control device 26 controls the discharge of liquid water from the second water discharge line 72 in correspondence with the water level L2 of liquid water stored in the second tank 120. As described above, the water level L2 is detected by the second water level sensor 122. For performing the electrolysis process, the control device 26 sets an upper limit value THl2emax of the water level L2 (hereinafter also referred to as the "electrolysis time upper limit value THl2emax") and a lower limit value THl2emin (hereinafter referred to as the "electrolysis time lower limit value THl2emin").

As the electrolysis process proceeds, when the water level L2 has a value equal to or more than the electrolysis time upper limit value THl2emax, the control device 26 places the low pressure water discharge solenoid valve 140 in the open state (FIG. 3). As a result, the liquid water in the second tank 120 is discharged from the second water discharge line 72 to the outside. Further, when the water level L2 has a value equal to or less than the electrolysis time lower limit value THl2emin, the control device 26 places the low pressure water discharge solenoid valve 140 in the closed state (FIG. 3). As a result, the supply of water from the second tank 120 to the outside is stopped.

(A-2-1-2-8. Discharge of Oxygen)

The oxygen produced at the anode is discharged to the outside through the anode system 20. The same method of discharging oxygen as the method disclosed, e.g., in JP2012-219276A, JP2014-080634A, or JP2015-175037A may be used.

(A-2-1-3. Depressurizing Process (S16 of FIG. 2))

The depressurizing process is a process of reducing the pressure in the cathode system 24 (in particular, the pressure P1 in the high pressure gas liquid separator 60). In FIG. 3, the depressurizing process corresponds to the "DEPRESSURIZING PROCESS TIME" at the rightmost. The purpose of the depressurizing process is to prevent the hydrogen from infiltrating from the cathode system 24 into the anode system 20. Instead of this purpose, or in addition to this purpose, the purpose of the depressurizing process may be protection of the solid polymer electrolyte membrane.

In the case where the depressurizing process is performed mainly for the purpose of preventing the hydrogen from being infiltrated from the cathode system 24 into the anode system 20, the depressurizing process is performed until the pressure in the cathode system 24 (e.g., the pressure P1 in the first tank 80) becomes equal to the pressure in the anode system 20. Alternatively, the depressurizing process may not be performed until the pressure in the cathode system 24 becomes equal to the pressure in the anode system 20 as long as the pressure in the cathode system 24 is reduced up to a value which makes it possible to substantially prevent the hydrogen from being infiltrated from the cathode system 24 into the anode system 20. Alternatively, the pressure in the cathode system 24 may be decreased until the pressure difference between the pressure in the cathode system 24 and the pressure in the anode system 20 becomes a value where the quantity of the hydrogen infiltrated from the cathode system 24 into the anode system 20 is substantially negligible. Further, in the case where the depressurizing process is performed mainly for the purpose of protecting the solid polymer electrolyte membrane, the depressurizing process is performed until the pressure in the cathode system 24 is reduced to have a value equal to or less than a value suitable for protection of the solid polymer electrolyte membrane.

In the depressurizing process of the embodiment of the present invention, after the liquid water is discharged, the hydrogen is discharged. Alternatively, the liquid water may be discharged after the hydrogen is discharged. Alternatively, the hydrogen and the liquid water may be discharged alternately or at the same time.

In the depressurizing process, in the state where the electrolysis power supply 34 is turned on, the control device 26 controls each of the valves as shown in FIG. 3. Specifically, at the time of starting the depressurizing process, in the state where the electrolysis power supply 34 is kept in the ON state, the control device 26 opens the high pressure water discharge solenoid valve 102, the depressurizing solenoid valve 114, and the low pressure water discharge solenoid valve 140, and places the depressurizing pressure reducing valve 110 and the metering valve 112 in the ON state. At this time, in order to keep the flow rate of the liquid water in the depressurizing line 66 at a flow rate threshold value or less, the control device 26 adjusts the open state of the metering valve 112 in correspondence with the pressure P1 in the first tank 80. As a result, the liquid water in the first tank 80 is released to the second tank 120 through the first water discharge line 64 and the depressurizing line 66. Further, the liquid water in the second tank 120 is discharged to the outside through the second water discharge line 72.

For the control of the high pressure water discharge solenoid valve 102 at the time of performing the depressurizing process, the control device 26 sets a lower limit value TH11dmin of the water level L1 in the first tank 80 (hereinafter also referred to as the "depressurizing time lower limit value TH11dmin"). The lower limit value TH11dmin in the embodiment of the present invention is a fixed value.

The control device 26 keeps the open state of the solenoid valve 102 until the value of the water level L1 becomes equal to or less than the lower limit value TH11dmin to continue the discharge of the liquid water in the first tank 80. When the value of the water level L1 becomes equal to or less than the lower limit value TH11dmin, the control device 26 closes the high pressure water discharge solenoid valve 102. As a result, the discharge of the liquid water from the first tank 80 to the second tank 120 is stopped. When the value of the water level L1 becomes equal to or more than the lower limit value TH11dmin, the control device 26 opens the high pressure water discharge solenoid valve 102. As a result, the discharge of the liquid water from the first tank 80 to the second tank 120 is resumed.

As described above, by switching opening and closing of the solenoid valve 102 repeatedly in correspondence with the water level L1, the liquid water in the first tank 80 is released to the second tank 120.

For the control of low pressure water discharge solenoid valve 140 at the time of performing the depressurizing process, the control device 26 sets a lower limit value TH12dmin of the water level L2 in the second tank 120 (hereinafter also referred to as the "depressurizing time lower limit value TH12dmin"). The lower limit value TH12dmin in the embodiment of the present invention is a fixed value.

The control device 26 keeps the open state of the solenoid valve 140 until the value of the water level L2 becomes equal to or less than the lower limit value TH12dmin to continue the discharge of the liquid water in the second tank 120. When the value of the water level L2 in the second tank 120 becomes equal to or less than the lower limit value TH12dmin, the control device 26 closes the low pressure water discharge solenoid valve 140. As a result, the discharge of the liquid water from the second tank 120 to the outside is stopped. When the value of the water level L2 becomes equal to or more than the lower limit value TH12dmin, the control device 26 opens the low pressure water discharge solenoid valve 140. As a result, the discharge of the liquid water from the second tank 120 to the outside is resumed.

As described above, by switching opening and closing of the solenoid valve 140 repeatedly in correspondence with the water level L2, the liquid water in the second tank 120 is released to the outside.

When the water level L2 is increased by supplying the liquid water from the first tank 80 to the second tank 120, the pressure P2 in the second tank 120 is increased. When the pressure of the hydrogen in the second tank 120 reaches a predetermined pressure value or more, the second back pressure valve 130 discharges the hydrogen to the outside automatically (i.e., without any instruction from the control device 26).

The hydrogen and the liquid water in the high pressure gas liquid separator 60 are discharged in the same manner. As described above, the liquid water may be discharged after the hydrogen is discharged. Alternatively, the hydrogen and the liquid water may be discharged alternately, or at the same time.

[A-2-2. Depressurizing Line Monitor Control]

(A-2-2-1. Overall Flow of Depressurizing Line Monitor Control)

As described above, in the embodiment of the present invention, in step S12 of FIG. 2, depressurizing line monitor control for monitoring the depressurizing line 66 is implemented. In the depressurizing line monitor control, the occurrence of hydrogen leakage in the depressurizing line 66 (i.e., seat leakage at the depressurizing solenoid valve 114) is monitored. In FIG. 3, the depressurizing line monitor control corresponds to "ELECTROLYSIS START TIME (DEPRESSURIZING LINE MONITOR CONTROL TIME)" on the left side.

Figure 4:
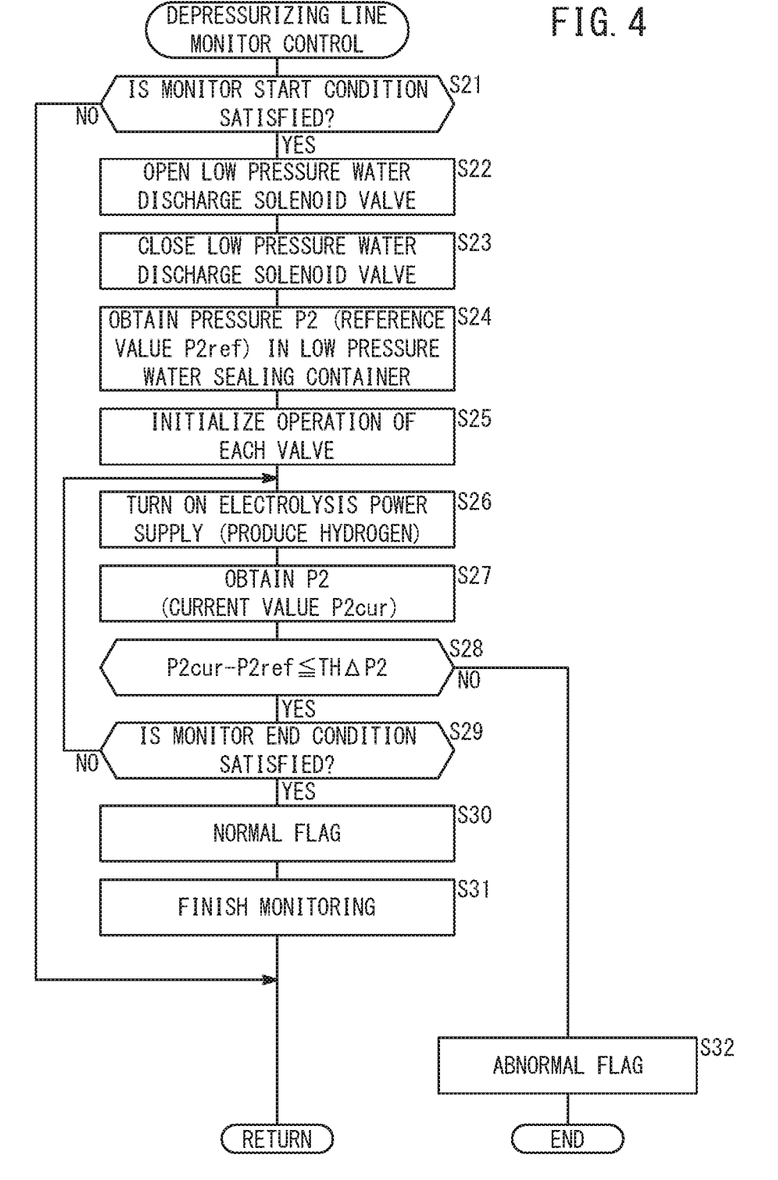
FIG. 4 is a flow chart showing the depressurizing line monitor control according to the embodiment.

FIG. 4 is a flow chart of the depressurizing line monitor control according to the embodiment of the present invention. In step S21 of FIG. 4, the control device 26 determines whether or not the monitor start condition of the depressurizing line 66 is satisfied. In the embodiment, the monitor start condition is satisfied when normal electrolysis control is started. Therefore, by combining the process with step S11 of FIG. 2, it is possible to omit step S21. As described later, the monitor start condition may be satisfied at different timing.

In the case where the monitor start condition is not satisfied (S21: NO), i.e., during the standby time period, the control device 26 places each of the valves (solenoid valves 102, 114, 140, etc.) in a state corresponding to the "STANDBY TIME" in FIG. 3. For example, the control device 26 turns off the electrolysis power supply 34, closes the solenoid valves 102, 140, opens the solenoid valve 114, and places the pressure reducing valve 110 and the metering valve 112 in the OFF state.

In the case where the monitor start condition is satisfied (S21: YES), in step S22, the control device 26 switches the low pressure water discharge solenoid valve 140 from the closed state to the open state to start depressurizing in the low pressure water sealing container 68 (in the second tank 120). Switching from the closed state to the open state is, e.g., performed during a predetermined time period Tdp [sec] (e.g., several seconds). In this manner, it is possible to control the pressure P2 in the second tank 120 to the atmospheric pressure or an approximate value of the atmospheric pressure.

Alternatively, the control device 26 may place the solenoid valve 140 in the open state until the water level L2 of the low pressure water sealing container 68 is decreased to the water level threshold value THl2a. Alternatively, the control device 26 may place the solenoid valve 140 in the open state until the pressure value P2 in the low pressure water sealing container 68 is reduced to a pressure threshold value THp2a.

After elapse of the predetermined time period Tdp from the time the solenoid valve 140 is placed in the open state, in step S23, the control device 26 returns the low pressure water discharge solenoid valve 140 from the open state to the closed state. In this manner, depressurization in the low pressure water sealing container 68 is finished. As a result, the pressure P2 in the second tank 120 is decreased to the desired value.

In step S24, the control device 26 obtains the pressure P2 in the low pressure water sealing container 68 (hereinafter referred to as the "reference value P2*ref*"). The reference value P2ref herein may be an average value, etc. based on a plurality of pressures P2. When the end of depressurization in step S23 is determined by reduction of the pressure P2 to the pressure threshold value THp2a, the control device 26 may use the pressure threshold value THp2a as the reference value P2ref instead of obtaining the pressure P2 from the second pressure sensor 124.

In step S25, the control device 26 performs initialization operation for electrical decomposition. Specifically, as shown in FIG. 3, the control device 26 controls the electrolysis power source 34 and the valves as in the case of the electrolysis process (S14 in FIG. 2 and "ELECTROLYSIS PROCESS TIME (NORMAL) in FIG. 3").

In step S26, the control device 26 turns on the electrolysis power supply 34 to produce the hydrogen and oxygen by electrical decomposition of the pure water (i.e., performs the electrolysis process). In step S27, the control device 26 obtains the pressure P2 in the low pressure water sealing container 68 (hereinafter referred to as the "present value P2cur". The present value P2cur herein may be an average value, etc. based on a plurality of pressures P2.

In step S28, the control device 26 determines whether or not the difference "P2cur−P2ref" between the current value P2cur and the reference value P2ref is the pressure difference threshold value THΔP2 or less. The pressure difference threshold value THΔP2 is a threshold value for determining hydrogen leakage in the depressurizing line 66 (seat leakage at the depressurizing solenoid valve 114). If the difference "P2cur−P2ref" is equal to or less than the pressure difference threshold value THΔP2 (S28: YES), it is determined that no seat leakage at the depressurizing solenoid valve 114 has occurred.

In this case, in step S29, the control device 26 determines whether or not the monitor end condition of the depressurizing line 66 has been satisfied. For example, the monitor end condition is satisfied after elapse of a predetermined time period from the time when the monitor start condition was satisfied. If the monitor end condition is not satisfied (S29: NO), the routine returns to step S26. If the monitor end condition is satisfied (S29: YES), the routine proceeds to step S30.

In step S30, the control device 26 stores a flag (normal flag) indicating that no hydrogen leakage in the depressurizing line 66 has occurred, in the storage unit 154. In step S13 of FIG. 2, it is determined that the depressurizing line 66 is normal based on the normal flag.

In the subsequent step S31, the control device 26 finishes monitoring of the depressurizing line 66. As described above, in the case of implementing the depressurizing line monitor control after starting the normal electrolysis control, the control device 26 continues the normal electrolysis control after finishing the depressurizing line monitor control. In the case where the control device 26 does not continue the normal electrolysis control after finishing the normal electrolysis control, after the control device 26 performs the above depressurizing process (S16 in FIG. 2 and FIG. 3), the routine returns to the state in the standby time (FIG. 3).

As to step S28, if the difference "P2cur−P2ref" is not equal to or not less than the pressure threshold value THΔP2 (S28: NO), it means that the pressure P2 in the second tank 120 has been increased (FIG. 5B) even though the high pressure water discharge solenoid valve 102 and the depressurizing solenoid valve 114 are in the closed state. Stated otherwise, it means that hydrogen leakage has occurred in the depressurizing line 66 (seat leakage has occurred in the solenoid valve 114).

Then, in step S32, the control device 26 stores a flag (abnormal flag) indicating that hydrogen leakage has occurred in the depressurizing line 66, in the storage unit 154. In step S13 of FIG. 2, it is determined that the depressurizing line 66 is not normal based on the abnormal flag.

(A-2-2-2. Comparison Between Normal Time and Abnormal Time)

Figure 5A:
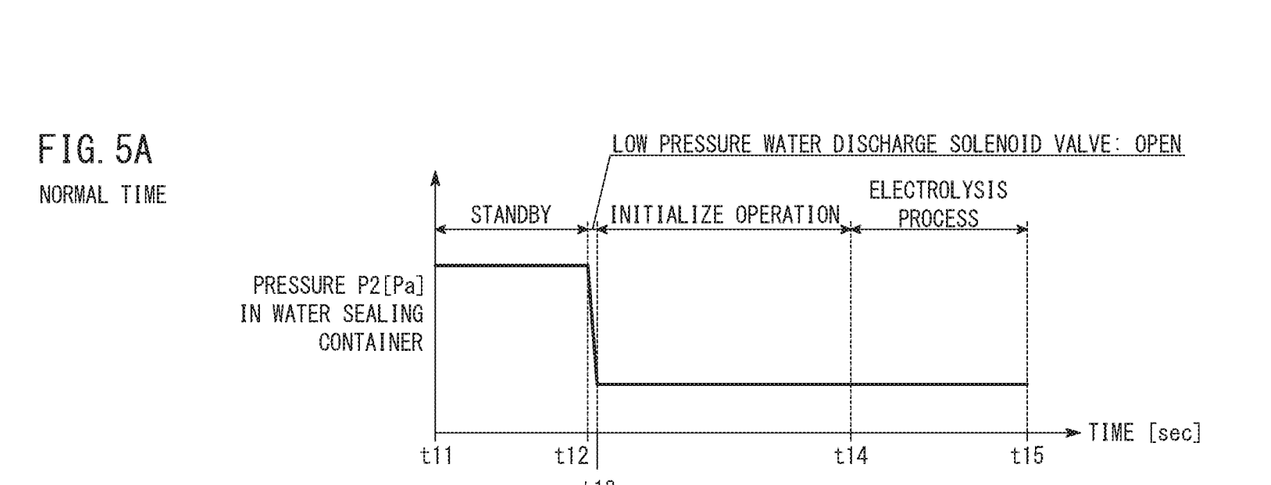
FIG. 5A is a time chart showing an example where the depressurizing line monitor control in the embodiment is performed in a normal cathode system.
Figure 5B:
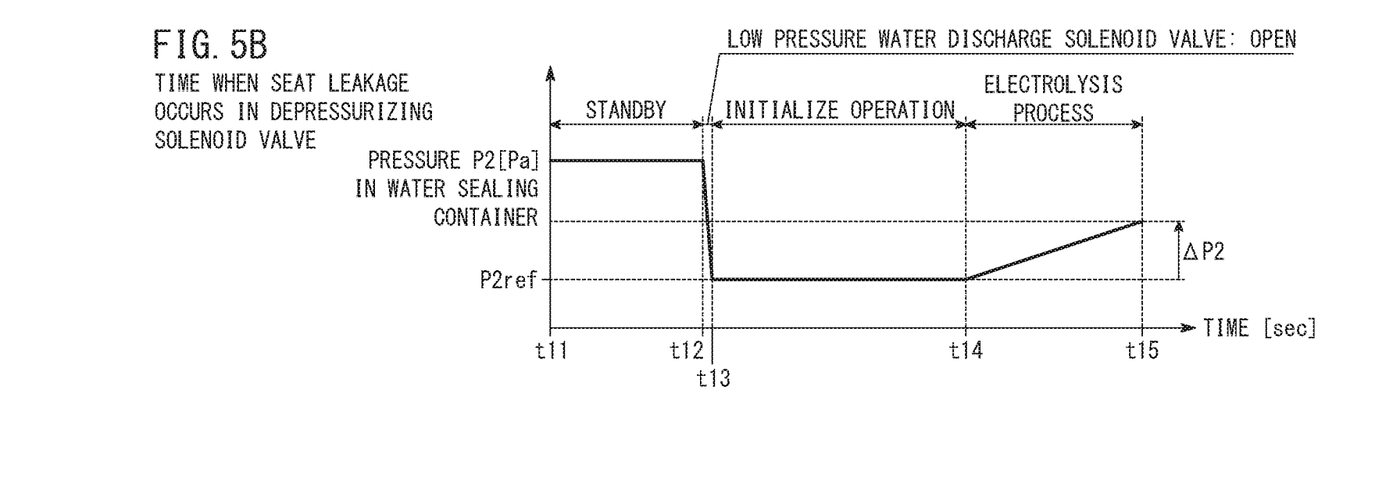
FIG. 5B is a time chart showing an example where the depressurizing line monitor control in the embodiment is performed in the cathode system having abnormality.

FIG. 5A is a time chart showing an example where the depressurizing line monitor control in the embodiment of the present invention is performed in the normal cathode system 24. FIG. 5B is a time chart showing an example where the depressurizing line monitor control in the embodiment of the present invention is performed in the cathode system 24 having abnormality. The abnormality herein means a state where hydrogen leakage has occurred in the depressurizing line 66 (seat leakage has occurred at the depressurizing solenoid valve 114).

In both of FIG. 5A (normal time) and FIG. 5B (seat leakage occurrence time), during a period from the time point t11 to the time point t12, the control device 26 is in the standby state (S21 of FIG. 4: NO). During a period from the time point t12 to the time point t13, the control device 26 opens the low pressure water discharge solenoid valve 140 (S22 to S23 in FIG. 4). As a result, the pressure P2 in the low pressure water sealing container 68 is decreased. During a period from the time point t13 to the time point t14, the control device 26 performs initialization operation for performing the electrolysis process (S25 in FIG. 4). During a period from the time point t14 to the time point t15, the control device 26 performs the electrolysis process (S26 in FIG. 4).

In the case of FIG. 5A, no seat leakage has occurred at the depressurizing solenoid valve 114. Therefore, the pressure P2 in the water sealing container 68 does not change significantly even after starting the electrolysis process (the time point t14 to the time point t15 in FIG. 5A).

In contrast, in the case of FIG. 5B, seat leakage has occurred at the depressurizing solenoid valve 114. Therefore, the pressure P1 in the gas liquid separator 60 (first tank 80) is transmitted to the water sealing container 68 (second tank 120) through the depressurizing line 66. Thus, when the electrolysis process is started, the pressure P2 is increased as a result of the increase in the pressure P1 (the time point t14 to the time point t15 in FIG. 5B). As a result, the difference ΔP2 (=P2cur−P2ref) between the current value P2cur and the reference value P2ref exceeds the pressure difference threshold value THΔP2 (S28 of FIG. 4: NO). Therefore, it becomes possible for the control device 26 to determine the occurrence of seat leakage at the depressurizing solenoid valve 114.

A-3. Advantages of Embodiment of the Present Invention

As described above, in the embodiment of the present invention, the occurrence of hydrogen leakage in the depressurizing line 66 (seat leakage at the depressurizing solenoid valve 114) is determined in correspondence with the pressure P2 in the low pressure water sealing container 68 provided downstream of the first water discharge line 64 and the depressurizing line 66, (FIGS. 4, 5A, and 5B). In this manner, in the structure including the low pressure water sealing container 68, it becomes possible to determine the hydrogen leakage in the depressurizing line 66 easily. As a result, it becomes possible to control the discharge of hydrogen suitably.

Further, if a relatively large quantity of hydrogen leakage occurs, hydrogen leakage in the depressurizing line 66, etc. can be detected successfully by the decrease in the pressure P1 in the high pressure gas liquid separator 60. However, in the case where leakage of hydrogen is relatively small, the pressure P1 may not be decreased significantly. In this case, since the hydrogen leaks continuously through the depressurizing line 66, the quantity of hydrogen supplied from the hydrogen outlet line 62 (e.g., quantity of hydrogen supplied to the FCV) is decreased. In the embodiment of the present invention, since the pressure P2 in the low pressure water sealing container 68 is used, even in the case where a relative small quantity of hydrogen leakage occurs, it is possible to determine the occurrence of hydrogen leakage easily. Also in this respect, it is possible to control the discharge of hydrogen suitably.

The control method of the water electrolysis system 10 according to the embodiment of the present invention includes the steps of obtaining the pressure at electrolysis time (S27 of FIG. 4) by the control device 26, by placing the high pressure water discharge solenoid valve 102, the depressurizing solenoid valve 114, and the low pressure water discharge solenoid valve 140 in the closed state, and obtaining the current value P2cur (electrolysis time pressure) which is the pressure P2 in the low pressure water sealing container 68 during production of hydrogen (electrolysis process) by the water electrolyzer 22, by the second pressure sensor 124 (the pressure acquisition unit), and determining hydrogen leakage by the control device 26, by determining the occurrence of hydrogen leakage in the depressurizing line 66 based on at least the current value P2cur (S28 in FIG. 4).

In the embodiment of the present invention, the occurrence of hydrogen leakage in the depressurizing line 66 is determined based on at least the current value P2cur (electrolysis time pressure) (FIG. 3 to FIG. 5B). In this manner, in the structure having the low pressure water sealing container 68, it becomes possible to determine hydrogen leakage in a simple scheme. As a result, it becomes possible to control the discharge of hydrogen suitably.

The control method of the water electrolysis system 10 according to the embodiment of the present invention may include the step of obtaining a reference pressure (S24 of FIG. 4) by the control device 26, by placing the high pressure water discharge solenoid valve 102 and the low pressure water discharge solenoid valve 140 in the closed state, placing the depressurizing solenoid valve 114 in the open state by the control device 26, obtaining the pressure P2 in the low pressure water sealing container 68 during stop of production of the hydrogen (electrolysis process) by the water electrolyzer 22 as the reference pressure P2ref by the second pressure sensor 124 (pressure acquisition unit). In the hydrogen leakage determination step (S28), the control device 26 determines the occurrence of hydrogen leakage based on a result of comparison between the current value P2cur (electrolysis time pressure) and the reference value P2ref. In comparison with the case of monitoring the change of the current value P2cur over time, the difference between the current value P2cur and the reference value P2ref tends to become large. Therefore, by determining the occurrence of hydrogen leakage using the result of comparison between the current value P2cur and the reference value P2ref, it becomes possible to determine the hydrogen leakage relatively highly accurately.

In the embodiment of the present invention, in the reference pressure acquisition step (S24 of FIG. 4), after the control device 26 places the low pressure water discharge solenoid valve 140 in the open state to reduce the pressure in the low pressure water sealing container 68, the control device 26 may obtain the reference value P2ref (reference pressure) by the second pressure sensor 124 (the pressure acquisition unit). Further, in the hydrogen leakage determining step (S28), the control device 26 determines the occurrence of hydrogen leakage based on a result of comparison between the current value P2cur (electrolysis time pressure) and the reference value P2ref after pressure reduction (S28 of FIG. 4, and FIGS. 5A, 5B). In this manner, by using the reduced reference value P2ref, the difference between the current value P2cur and the reference value P2ref is highlighted, and thus, it becomes possible to determine the occurrence of hydrogen leakage highly accurately. Further, in the case where the reference value P2ref of the pressure is reduced to a certain fixed value, after determination of hydrogen leakage is made repeatedly a plurality of times, the changes in the plurality of current values P2cur can be understood easily. Therefore, it becomes possible to determine the occurrence of hydrogen leakage relatively highly accurately.

In the embodiment of the present invention, the hydrogen leakage determination step (S28 of FIG. 4) is performed at the time of starting production of hydrogen (electrolysis process) by the water electrolyzer 22 (S11 of FIG. 2: YES, S21 of FIG. 4: YES). Therefore, by determining the occurrence of hydrogen leakage in the state where changes in the current value P2cur (electrolysis time pressure) are relatively large, it becomes possible to determine the occurrence of hydrogen leakage highly accurately. Further, by determining the occurrence of hydrogen leakage at the time of starting production of hydrogen, when the hydrogen leakage occurs, it becomes possible to rapidly stop hydrogen production.

B. Modified Embodiment

It should be noted that the present invention is not limited to the above embodiment. It is a matter of course that various structures may be adopted based on the description of the specification. For example, the following structures may be adopted.

B-1. Possible Applications

In the above embodiment, it is assumed that the hydrogen produced in the water electrolysis system 10 is supplied to the fuel cell vehicle (FCV). However, the present invention is not limited, e.g., in respect of determining hydrogen leakage in the depressurizing line 66 using the pressure P2 in the low pressure water sealing container 68 (in the second tank 120). For example, the hydrogen produced in the water electrolysis system 10 may be supplied to a domestic fuel cell.

B-2. Structure of Cathode System 24

[B-2-1. Hydrogen Outlet Line 62]
In the embodiment of the present invention, the first back pressure valve 94 is provided in the hydrogen outlet line 62 (FIG. 1). However, the present invention is not limited, e.g., in respect of determining hydrogen leakage in the depressurizing line 66 using the pressure P2 in the low pressure water sealing container 68 (in the second tank 120). For example, the first back pressure valve 94 may be replaced with a solenoid valve (hydrogen outlet solenoid valve). In this case, when the pressure P1 in the first tank 80 has a predetermined value or more, the control device 26 may place the hydrogen outlet solenoid valve in the open state temporarily.

[B-2-2. First Water Discharge Line 64]
In the above embodiment, the orifice 100 and the high pressure water discharge solenoid valve 102 are provided in the first water discharge line 64 (FIG. 1). However, the present invention is not limited, e.g., in respect of determining hydrogen leakage in the depressurizing line 66 using the pressure P2 in the low pressure water sealing container 68 (in the second tank 120). For example, the orifice 100 may be omitted.

[B-2-3. Depressurizing Line 66]
In the above embodiment, the pressure reducing valve 110, the metering valve 112, and the depressurizing solenoid valve 114 (FIG. 1) are provided in the depressurizing line 66. However, the present invention is not limited, e.g., in respect of determining hydrogen leakage in the depressurizing line 66 using the pressure P2 in the low pressure water sealing container 68 (in the second tank 120). For example, either the pressure reducing valve 110 or the metering valve 112 may be omitted.

In the above embodiment, the depressurizing line 66 is merged with the first water discharge line 64 (FIG. 1). However, the present invention is not limited, e.g., in respect of determining hydrogen leakage in the depressurizing line 66 using the pressure P2 in the low pressure water sealing container 68 (in the second tank 120). For example, the depressurizing line 66 may be connected to the low pressure water sealing container 68 without being merged with the first water discharge line 64. Stated otherwise, in the low pressure water sealing container 68, the depressurizing line 66 may be merged with the first water discharge line 64.

[B-2-4. Low Pressure Water Sealing Container 68]
In the above embodiment, it is assumed that the gas retained in the low pressure water sealing container 68 (second tank 120) is only hydrogen (see FIG. 1). However, for example, if it is ensured that the external air is prevented from being infiltrated into the high pressure gas liquid separator 60, gases (external air) other than hydrogen may be permitted to be infiltrated into the second tank 120. For example, in the structure of FIG. 1, in the case where the first water discharge line 64 is closed by the liquid water in the second tank 120 to ensure that the external air is not infiltrated into the first water discharge line 64, the external air may be infiltrated into the second tank 120.

[B-2-5. Exhaust Gas Line 70]
In the embodiment of the present invention, the second back pressure valve 130 is provided in the exhaust gas line 70 (FIG. 1). However, the present invention is not limited, e.g., in respect of determining hydrogen leakage in the depressurizing line 66 using the pressure P2 in the low pressure water sealing container 68 (in the second tank 120). For example, the second back pressure valve 130 may be replaced with a solenoid valve (exhaust gas solenoid valve). In this case, when the pressure P2 in the second tank 120 becomes equal to or more than a predetermined value, the control device 26 can place the exhaust gas solenoid valve in the open state temporarily.

B-3. Control of Control Device 26

[B-3-1. Normal Electrolysis Control]
In the embodiment of the present invention, each of the valves (solenoid valves 102, 114, 140, etc.) is controlled in the method shown in FIG. 3. However, the present invention is not limited, e.g., in respect of determining hydrogen leakage in the depressurizing line 66 using the pressure P2 in the low pressure water sealing container 68 (in the second tank 120). For example, each of the valves may be controlled by a method other than the method shown in FIG. 3.

[B-3-2. Depressurizing Line Monitor Control]
(B-3-2-1. Timing of Implementing Control)
In the embodiment of the present invention, the monitor start condition in the depressurizing line monitor control is satisfied when the normal electrolysis control is started (S21 in FIG. 4). However, the present invention is not limited, e.g., in respect of determining hydrogen leakage in the depressurizing line 66 using the pressure P2 in the low pressure water sealing container 68 (in the second tank 120). For example, the monitor start condition may be satisfied by the elapse of a predetermined time period (e.g., any value in a range of 10 seconds to 1 hour) from the previous depressurizing line monitor control, while implementing normal electrolysis control. Alternatively, the monitor start condition may be satisfied at the predetermined time (e.g., at 3 A.M. every day).

(B-3-2-2. Method of Determining Occurrence of Hydrogen Leakage)

In the embodiment of the present invention, hydrogen leakage in the depressurizing line 66 is determined based on the difference ΔP2 between the current value P2cur and the reference value P2ref (S28 of FIG. 4). However, the present invention is not limited, e.g., in respect of determining hydrogen leakage in the depressurizing line 66 using at least the current value P2cur (electrolysis time pressure).

For example, as described above, in the case where hydrogen leakage in the depressurizing line 66 (seat leakage at the depressurizing solenoid valve 114) has occurred, if the electrolysis power supply 34 is turned on after reducing the pressure in the second tank 120, the pressure P2 is increased (FIG. 5B). In consideration of this point, after starting the electrolysis process, the quantity of the change in the pressure P2 per unit time [Pa/sec] (hereinafter referred to as the "pressure change speed P2'") may be calculated, and hydrogen leakage in the depressurizing line 66 may be determined based on this pressure change speed P2'.

Alternatively, after the electrolysis power supply 34 is turned on, hydrogen leakage in the depressurizing line 66 may be determined based on the amount of change in the pressure P1 per unit time (or the trend of increase in the pressure P1) and the pressure change speed P2' (or the trend of increase in the pressure P2). Alternatively, in the case where it is possible to roughly presume the value of the pressure P2 in the second tank 120 as a result of the pressure reduction in the second tank 120, it may be possible to determine hydrogen leakage in the depressurizing line 66 using the current value P2cur as the single pressure P2 after the electrolysis power supply 34 is turned on. That is, it may be possible to determine that hydrogen leakage has occurred in the depressurizing line 66 if the single current value P2cur at certain timing after the electrolysis power supply 34 is turned on is equal to or more than the predetermined pressure threshold value.

(B-3-2-3. Other)

In the above embodiment, the pressure P2 in the second tank 120 is used to determine the occurrence of hydrogen leakage (seat leakage) in the depressurizing line 66. However, for example, the present invention is not limited in respect of determining leakage in a certain line (pipe) using the pressure P2 in the low pressure water sealing container 68 (in the second tank 120). For example, it is possible to determine leakage of the liquid water in the first water discharge line 64 (seat leakage at the high pressure water discharge solenoid valve 102, etc.).

B-4. Other

In the above embodiment, in comparing numeric values, the equal sign (=) is used in some cases and the equal sign (=) is not used in other cases (e.g., S28 of FIG. 4). However, for example, unless there is any specific significance in inclusion or exclusion of the equal sign (i.e., as long as the advantages of the invention can be obtained), it is possible to arbitrarily determine whether or not the equal sign should be included in comparing the numeric values.

In that sense, for example, in step S28 of FIG. 4, determination of whether the difference between the current value P2cur and the reference value P2ref is equal to or less than the pressure difference threshold value THΔP2 (P2cur−P2ref THΔP2) may be replaced with determination of whether the difference between the current value P2cur and the reference value P2ref is less than the pressure difference threshold value THΔP2 (P2cur−P2ref<THΔP2).

C. Description of Reference Numerals

10: water electrolysis system
20: anode system
22: water electrolyzer
24: cathode system
26: control device
60: gas liquid separator
62: hydrogen outlet line
64: first water discharge line
66: depressurizing line
68: low pressure water sealing container
70: exhaust gas line
72: second water discharge line
102: high pressure water discharge solenoid valve
114: depressurizing solenoid valve
124: second pressure sensor (pressure acquisition unit)
130: second back pressure valve (closing valve)
140: low pressure water discharge solenoid valve
P2: pressure in low pressure water sealing container
P2cur: current value (electrolysis time pressure)
P2ref: reference value (reference pressure)

What is claimed is:

1. A method of controlling a water electrolysis system, the water electrolysis system comprising:

a water electrolyzer configured to electrically decompose water to produce oxygen at an anode, and produce hydrogen having a pressure higher than a pressure of the oxygen at a cathode;

a gas liquid separator configured to separate water content contained in the hydrogen discharged from the water electrolyzer;

a hydrogen outlet line configured to lead the hydrogen out of the gas liquid separator;

a first water discharge line configured to discharge liquid water retained in the gas liquid separator;

a depressurizing line configured to depressurize the gas liquid separator;

a container that seals low pressure water in the container, wherein the container is provided downstream of the first water discharge line and the depressurizing line;

an exhaust gas line configured to discharge a gas from the container;

a second water discharge line configured to discharge the liquid water retained in the container;

a high pressure water discharge solenoid valve provided in the first water discharge line;

a depressurizing solenoid valve provided in the depressurizing line;

a closing valve provided in the exhaust gas line, and configured to close the exhaust gas line;

a low pressure water discharge solenoid valve provided in the second water discharge line;

a pressure acquisition unit configured to obtain a pressure in the container; and a control device configured to determine hydrogen leakage in the depressurizing line in correspondence with the pressure obtained by the pressure acquisition unit, the method comprising the steps of:

obtaining an electrolysis time pressure by the control device, by placing the high pressure water discharge solenoid valve, the depressurizing solenoid valve, and the low pressure water discharge solenoid valve in a closed state, and obtaining the pressure in the container during production of the hydrogen by the water electrolyzer as the electrolysis time pressure by the pressure acquisition unit;

determining hydrogen leakage by the control device, by determining occurrence of the hydrogen leakage in the depressurizing line based on at least the electrolysis time pressure; and obtaining a reference pressure by the control device, by placing the high pressure water discharge solenoid valve in the closed state, placing the depressurizing solenoid valve in the open state, and switching the low pressure water discharge solenoid valve between the closed state and the open state based on instructions from the control device, and obtaining the pressure in the container during stoppage of production of the hydrogen by the water electrolyzer as the reference pressure by the pressure acquisition unit, and wherein in the hydrogen leakage determination step, the control device determines the occurrence of hydrogen leakage based on a result of comparison between the electrolysis time pressure and the reference pressure.

2. The method of controlling the water electrolysis system according to claim 1, wherein in the reference pressure acquisition step, after the control device places the low pressure water discharge solenoid valve in the open state to reduce the pressure in the container, the control device obtains the reference pressure by the pressure acquisition unit; and in the hydrogen leakage determination step, the control device determines the occurrence of the hydrogen leakage based on a result of comparison between the electrolysis time pressure and the reference pressure after pressure reduction.

3. The method of controlling the water electrolysis system according to claim 1, wherein the hydrogen leakage determination step is performed at time of starting production of the hydrogen by the water electrolyzer.

\* \* \* \* \*